US012782802B2

(12) United States Patent
Osaka et al.

(10) Patent No.: US 12,782,802 B2
(45) Date of Patent: Nov. 3, 2026

(54) LENS DRIVING DEVICE AND CAMERA MODULE

(71) Applicant: MITSUMI ELECTRIC CO., LTD., Tokyo (JP)

(72) Inventors: Tomohiko Osaka, Tokyo (JP); Norikazu Kudo, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 219 days.

(21) Appl. No.: 18/755,325

(22) Filed: Jun. 26, 2024

(65) Prior Publication Data

US 2024/0427225 A1 Dec. 26, 2024

(30) Foreign Application Priority Data

Jun. 30, 2023 (JP) ................................. 2023-107692

(51) Int. Cl.
*G03B 35/08* (2021.01)

(52) U.S. Cl.
CPC .................................... *G03B 35/08* (2013.01)

(58) Field of Classification Search
CPC .. G03B 35/08; G03B 3/10; G03B 2205/0069; G03B 19/22; G03B 30/00; G03B 13/36; G03B 5/00; G03B 5/02; G03B 5/04; G03B 17/12; G02B 7/09; G02B 7/10; G02B 27/646; G02B 7/08; G02B 359/407; G02B 359/554; G02B 359/557; G02B 359/41; G02B 359/464; G02B 359/811; G02B 359/823; G02B 359/824; G02B 27/64; H04N 23/55; H04N 23/67; H04N 23/54; H04N 23/57; H04N 23/45; H04N 23/687; H02K 41/035
See application file for complete search history.

(56) References Cited

U.S. PATENT DOCUMENTS

2018/0031860 A1* 2/2018 Bachar ..................... G02B 7/06
2018/0100986 A1* 4/2018 Kim ....................... H04N 23/45
2018/0234629 A1* 8/2018 Tseng ..................... H04N 23/55
2020/0089088 A1* 3/2020 Ryu ....................... H04N 23/45
2021/0405508 A1* 12/2021 Kim ......................... G03B 5/00

FOREIGN PATENT DOCUMENTS

JP 2021175989 A 11/2021
KR 20160103680 A * 9/2016 ............... G02B 7/09
KR 20240156227 A * 10/2024 ............. H02K 33/18

* cited by examiner

*Primary Examiner* — Matthew Y Lee
(74) *Attorney, Agent, or Firm* — McCoy Russell LLP

(57) ABSTRACT

A lens driving device includes a lens holder, a housing for containing the lens holder therein, a support mechanism for supporting the lens holder so that the lens holder can be driven in an optical axis direction of two optical systems, and a driving mechanism including a coil provided on the lens holder and a magnet provided on the housing for providing driving force driving the lens holder in the optical axis direction. The lens holder includes a body portion, two openings for respectively containing the two optical systems therein, and a containing portion formed in the body portion so as to be located between the two openings and pass through the body portion in the optical axis direction for containing the support mechanism therein.

4 Claims, 9 Drawing Sheets

LENS DRIVING DEVICE AND CAMERA MODULE

CROSS-REFERENCE TO RELATED APPLICATION

The present application claims priority to Japanese Patent Application No. 2023-107692 filed on Jun. 30, 2023. The contents of the above-listed application are incorporated by reference for all purposes.

TECHNICAL FIELD

The present disclosure generally relates to lens driving devices and camera modules, in particular to a lens driving device configured to use a driving mechanism composed of a coil and a magnet to drive two optical systems, and a camera module including the lens drive device.

BACKGROUND ART

Conventionally, there has been known a lens driving device for driving two optical systems arranged side by side. Such a lens driving device is very useful in a case that it is necessary to synchronously drive the two optical systems in order to perform distance measurement to a subject with a stereo imaging method.

For example, patent document 1 discloses a lens driving device 500 shown in FIG. 1. The lens driving device 500 includes a housing 510 composed of a cover and a base, and an internal structure 520 contained in the housing 510. As shown in FIG. 2, the internal structure 520 includes two lens holders 521 for respectively holding two optical systems therein, two coils 522 respectively fixed on outer peripheral surfaces of the two lens holders 521, a magnet holder 523 covering the two lens holders 521 and the two coils 522 from an outer side, four magnets 524 held by the magnet holder 523 so as to be located on the outer side of the two coils 522, and a pair of leaf springs 525 for holding the two lens holders 521 so that the two lens holders 521 can be vibrated in an optical axis direction of the two optical systems.

When an electrical current flows in the coil 522, driving force (Lorentz force) is generated for driving the lens holder 521 to which the coil 522 in which the electrical current flows is attached in the optical axis direction, and thereby the lens holder 521 can be driven in the optical axis direction. Further, by controlling the electrical currents respectively supplied to the two coils 522, it is possible to synchronously drive the two lens holders 521.

On the other hand, as camera modules have been downsized for recent years, needs for reducing a size of the lens driving device has been increased. In order to reduce the size of the lens driving device, it is preferable to reduce the number of components constituting the lens driving device. However, in the configuration of the lens driving device 500 of the patent document 1, it is necessary to hold the two lens holders 521 with the pair of leaf springs 525 so that the two lens holders 521 can be vibrated in the vertical direction and hold the four magnets 524 with the magnet holder 523. Thus, the number of components of the lens driving device 500 cannot be reduced. Therefore, there are needs for a lens driving device which has a simple configuration constituted of a smaller number of components and whose size can be reduced.

RELATED ART DOCUMENT

Patent Document

[Patent document 1] JP 2021-175989A

SUMMARY OF THE INVENTION

Problem to be Solved by the Invention

The present disclosure has been made in view of the above-mentioned problem. Accordingly, it is an object of the present disclosure to provide a lens driving device which has a simple configuration constituted of a smaller number of components and whose size can be reduced, and a camera module including the lens driving device.

Means for Solving the Problem

The above object is achieved by the present disclosures defined by the following (1) and (2).

(1) A lens driving device, comprising:
- a lens holder for holding two optical systems;
- a housing for containing the lens holder therein;
- a support mechanism for supporting the lens holder in the housing so that the lens holder can be driven in an optical axis direction of the two optical systems; and
- a driving mechanism including a coil provided on the lens holder and a magnet provided on the housing for providing driving force driving the lens holder in the optical axis direction,
- wherein the lens holder includes:
  - a body portion,
  - two openings formed in the body portion so as to pass through the body portion in the optical axis direction and be spaced apart from each other for respectively containing the two optical systems therein, and
  - a containing portion formed in the body portion for containing the support mechanism therein, and
- wherein the containing portion is located between the two openings and passes through the body portion in the optical axis direction.

(2) A camera module comprising:
- a lens driving device defined by the above (1); and
- the two optical systems held by the lens holder of the lens driving device.

Effect of the Invention

In the lens driving device and the camera module of the present disclosure, the support mechanism for supporting the lens holder holding the two optical systems so that the lens holder can be driven in the optical axis direction of the two optical systems is contained in the containing portion formed between the two openings respectively holding the two optical systems. Therefore, compared with a conventional art in which a lens holder is supported by a pair of leaf springs so that the lens holder can be driven in an optical axis direction, it is possible to reduce the number of components of the lens driving device and simplify a configuration of the lens driving device. Further, since the support mechanism is contained in the containing portion of the lens holder, it is possible to effectively uses spaces in the housing, and thereby it is possible to reduce a size of the lens driving device.

DETAILED DESCRIPTION

Figure 1:
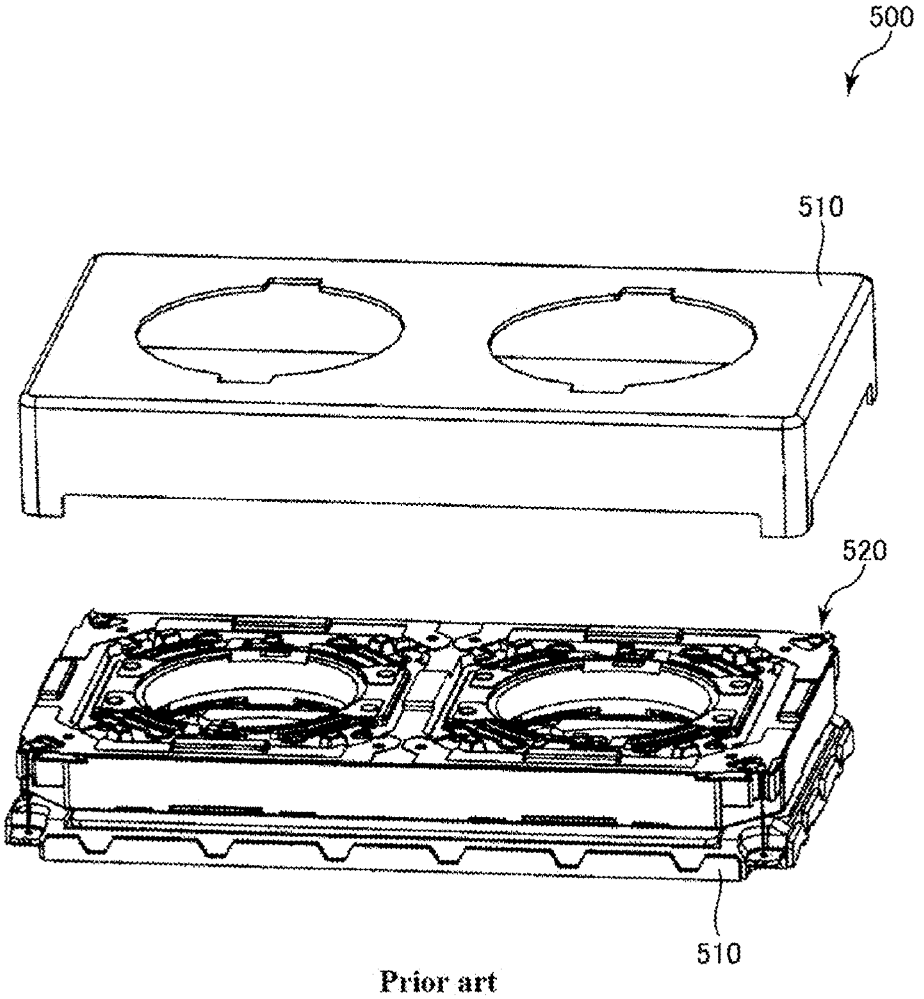
Prior art Fig. 1
FIG. 1 is an exploded perspective view of a conventional lens driving device.
Figure 2:
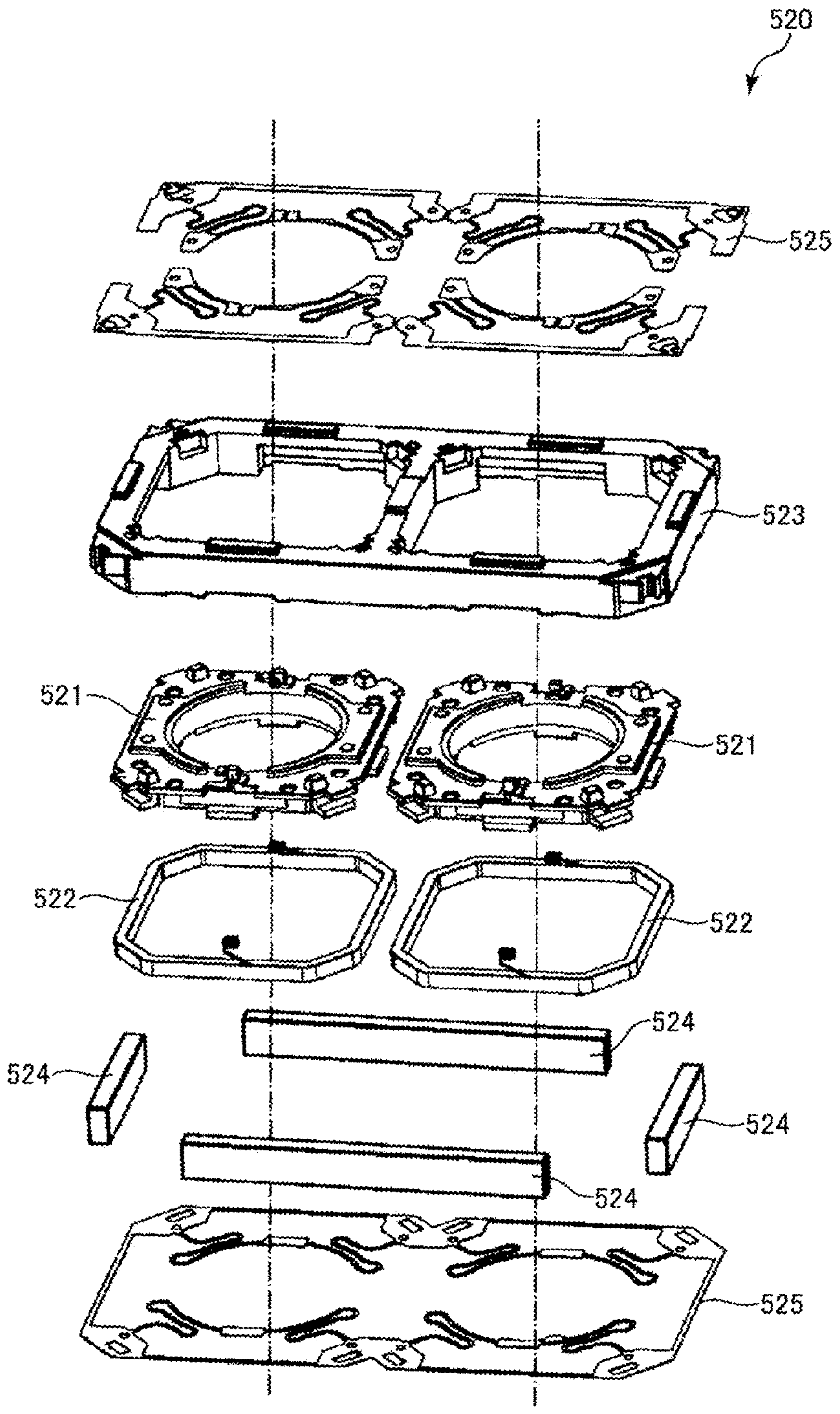
Prior art Fig. 2
FIG. 2 is an exploded perspective view of an inner structure of the lens driving device shown in FIG. 1.

Hereinafter, a lens driving device and a camera module of the present disclosure will be described with reference to a preferred embodiment shown in the accompanying drawings. Note that each of the figures referred in the following description is a schematic diagram prepared for explaining the present disclosure. A dimension (such as a length, a width, and a thickness) of each component shown in the drawings is not necessarily identical to an actual dimension. Further, the same reference numbers are used throughout the drawings to refer to the same or similar elements. In the following description, the Z direction of each figure may be referred to as "a vertical direction", the positive direction of the Z axis of each figure may be referred to "an upper side", and the negative direction of the Z axis of each figure may be referred to as "a lower side".

Figure 3:
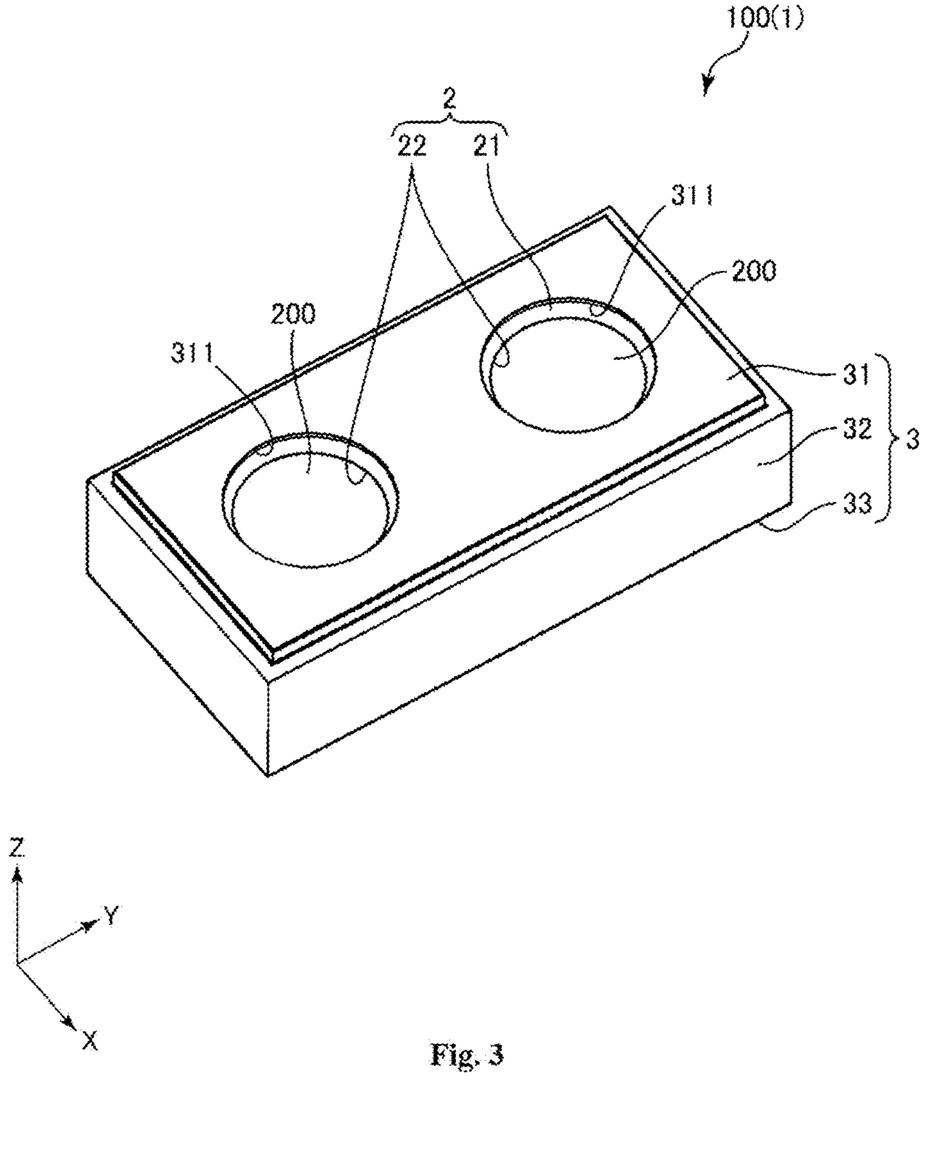
FIG. 3 is a perspective view of a camera module of the present disclosure.
Figure 4:
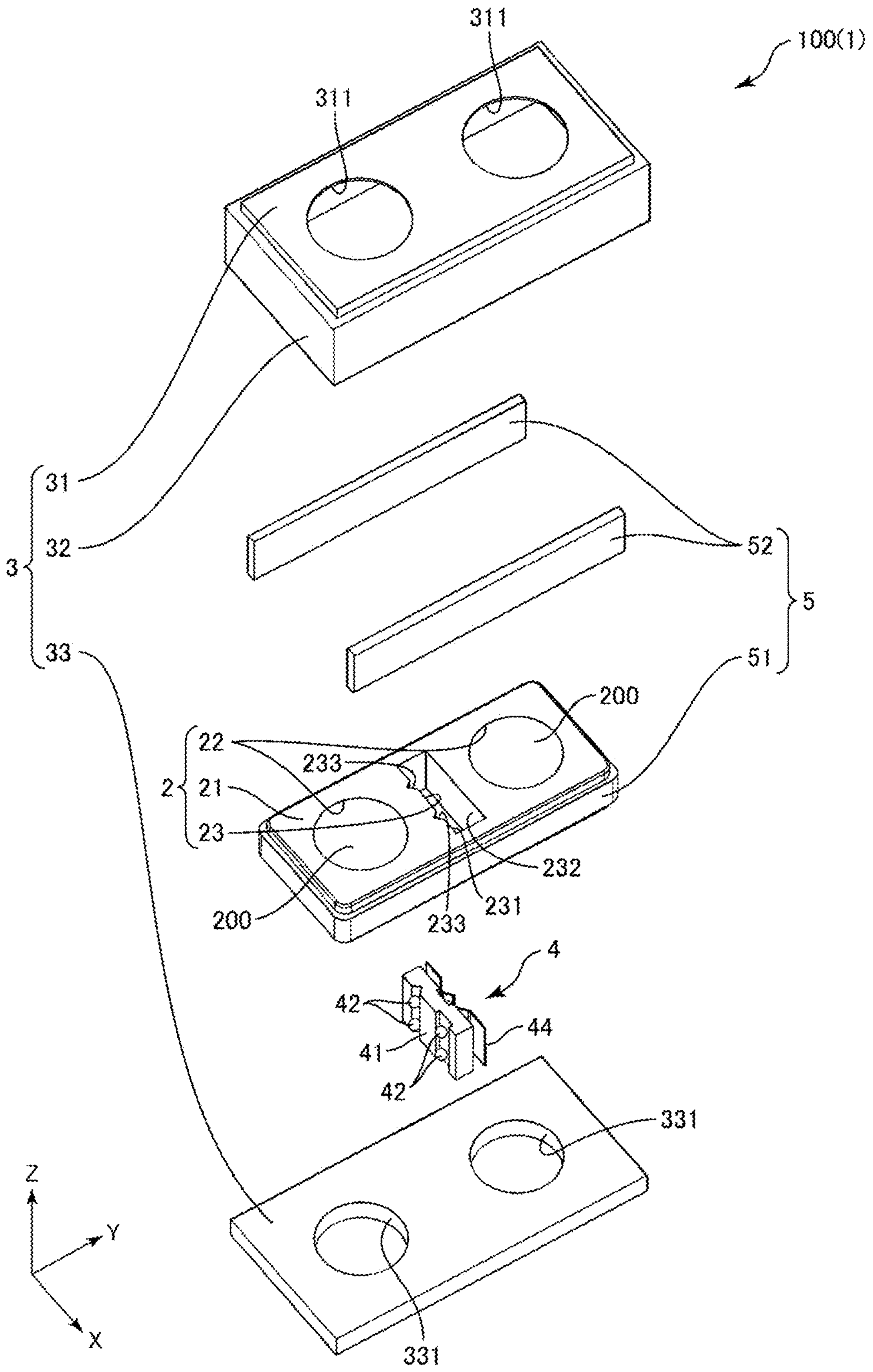
FIG. 4 is an exploded perspective view of the camera module shown in FIG. 3.
Figure 5:
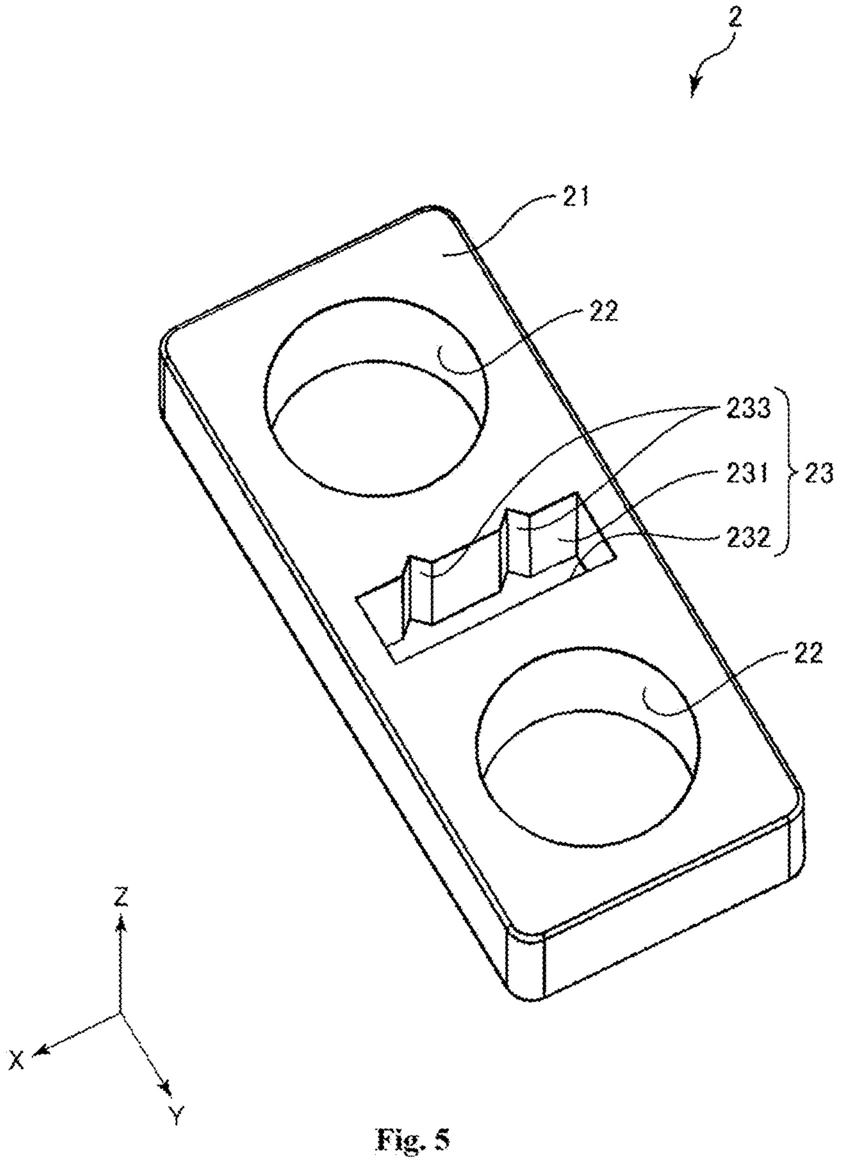
FIG. 5 is a perspective view of a lens holder shown in FIG. 4, which is viewed from another angle.
Figure 6:
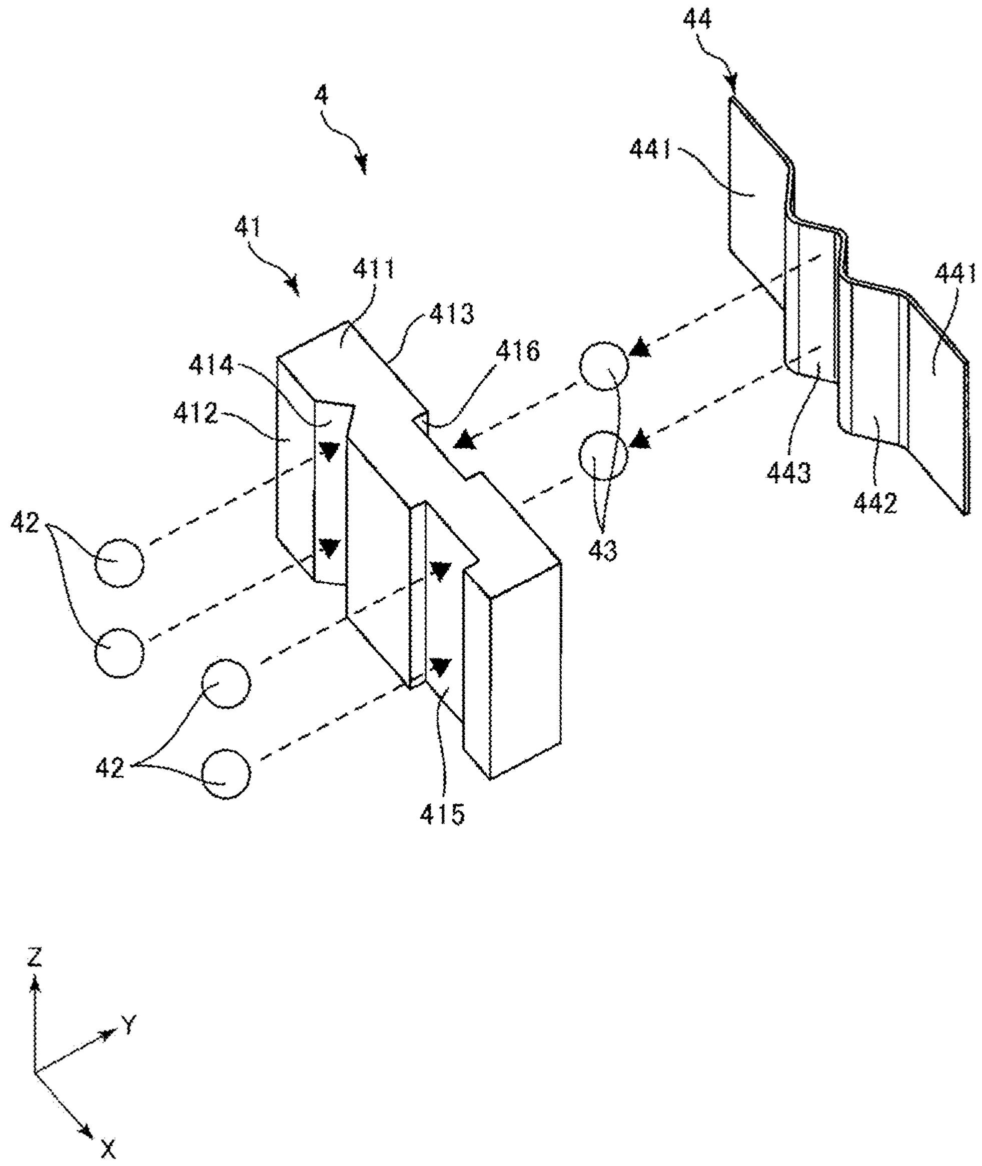
FIG. 6 is an exploded perspective view of a support mechanism shown in FIG. 4.
Figure 7:
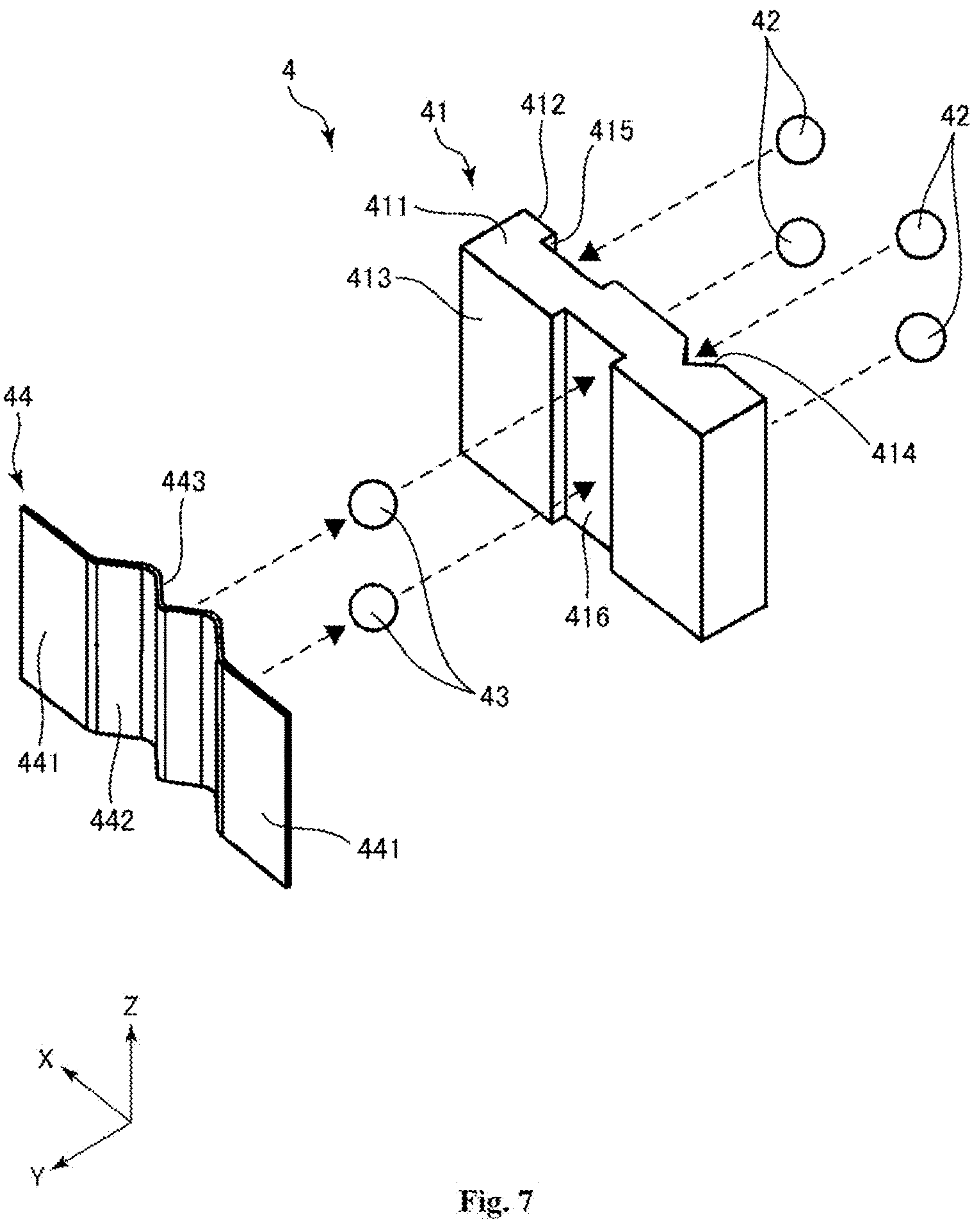
FIG. 7 is an exploded perspective of the support mechanism shown in FIG. 4, which is viewed from another angle.
Figure 8:
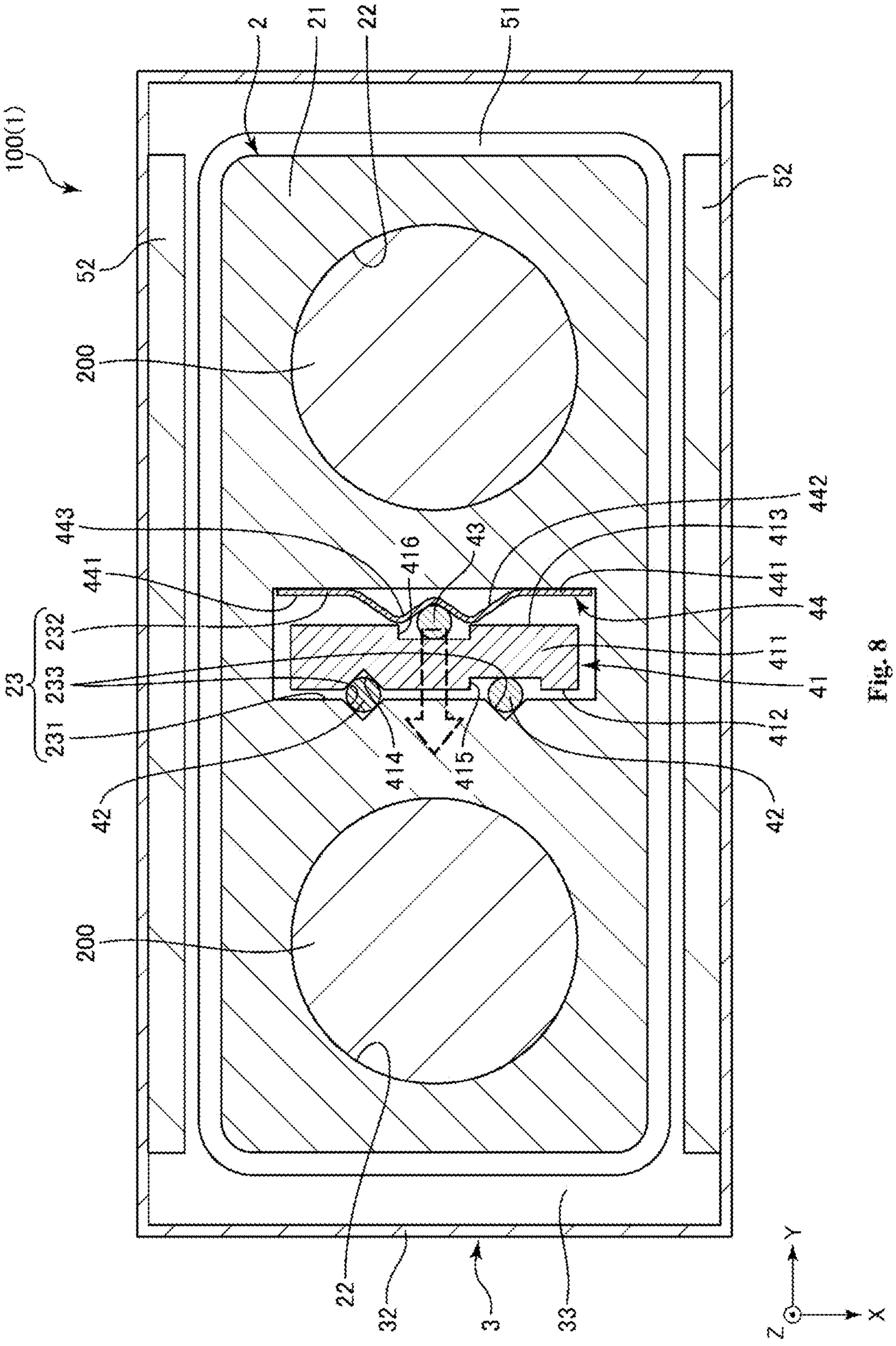
FIG. 8 is a horizontal cross-sectional view showing an internal structure of the camera module shown in FIG. 3.
Figure 9:
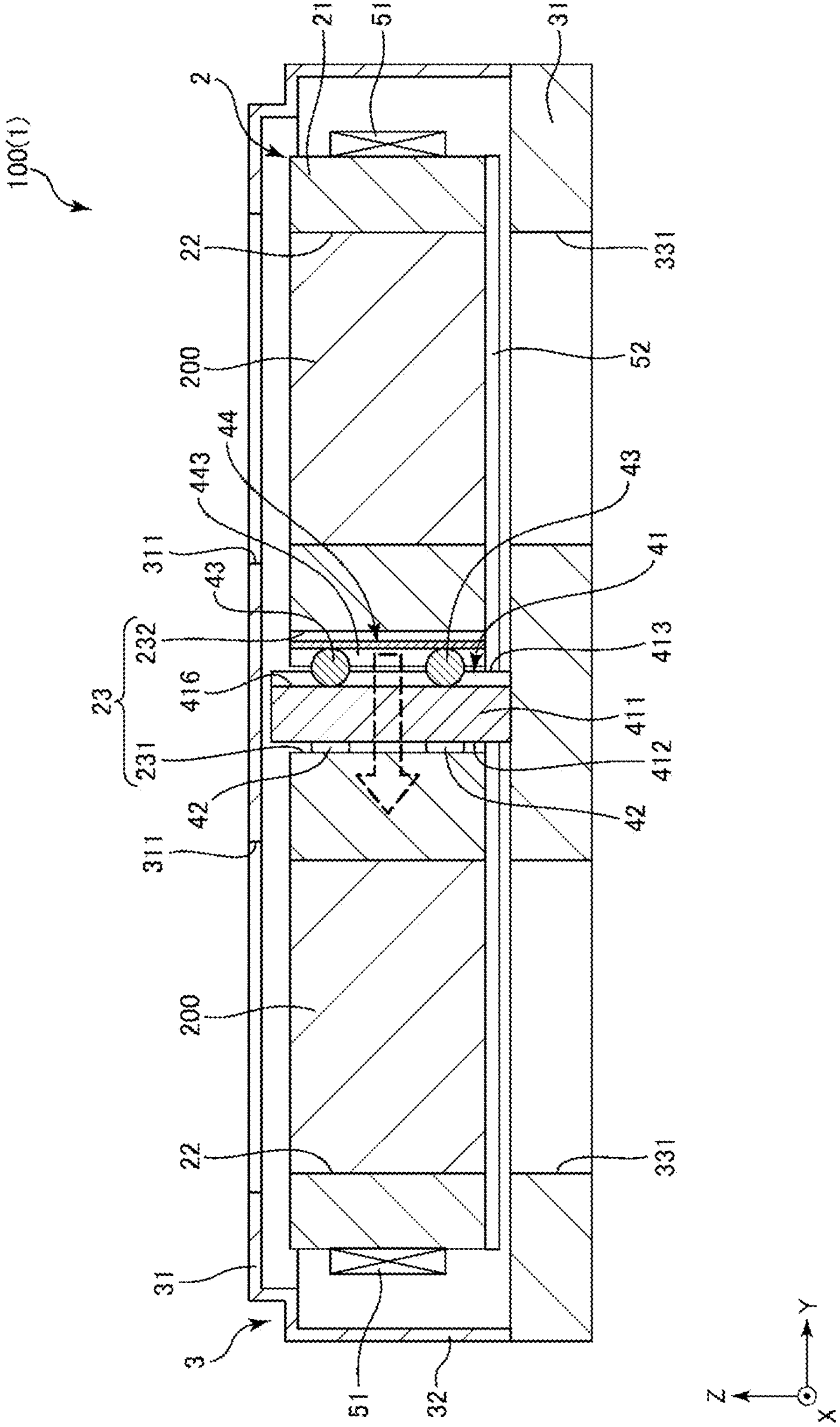
FIG. 9 is a longitudinal cross-sectional view showing the internal structure of the camera module shown in FIG. 3.

Hereinafter, a lens driving device and a camera module according to an embodiment of the present disclosure will be described in detail with reference to FIGS. 3 to 9. FIG. 3 is a perspective view of the camera module of the present disclosure. FIG. 4 is an exploded perspective view of the camera module shown in FIG. 3. FIG. 5 is a perspective view of a lens holder shown in FIG. 4, which is viewed from another angle. FIG. 6 is an exploded perspective view of a support mechanism shown in FIG. 4. FIG. 7 is an exploded perspective of the support mechanism shown in FIG. 4, which is viewed from another angle. FIG. 8 is a horizontal cross-sectional view showing an internal structure of the camera module shown in FIG. 3. FIG. 9 is a longitudinal cross-sectional view showing the internal structure of the camera module shown in FIG. 3.

A camera module 100 of the present disclosure shown in FIGS. 3 and 4 can be used in a smartphone, an automobile, a drone, a medical device, or the like for photographing an arbitrary object. The camera module 100 includes two optical systems 200 and a lens driving device 1 for holding the two optical systems 200 so that the two optical systems 200 can be driven along an optical axis direction of the two optical systems 200. The camera module 100 should be mounted on a circuit board on which two image sensors are provided and used for photographing the object. In a state that the camera module 100 is mounted on the circuit board, the two image sensors (not shown) for respectively photographing two optical images respectively formed by the two optical systems 200 are provided below the lens driving device 1. The two image sensors respectively photograph the two optical images respectively formed by the optical systems 200 to obtain stereo images. The two optical systems 200 may have the same optical characteristics (such as a focus length, an F number, and aberration characteristics). Alternatively, the two optical system 200 may have different optical characteristics.

In this regard, although each of the two optical systems 200 is schematically illustrated in the illustrated aspect with assuming that each of the two optical systems 200 is composed of only one lens, the present disclosure is not necessarily limited thereto as long as each of the two optical systems 200 can collect light from the object to form the optical image on an imaging plane of the corresponding image sensor. Each of the optical systems 200 may be composed of one or more lenses and optical elements such as an aperture. In addition, an optical axis direction of each of the two optical systems 200 coincides with the vertical direction (the Z direction) in each figure. Thus, in the following description, the term of "vertical direction" is used with the same meaning as "the optical axis direction of the optical systems 200". Further, the term of "upper side" is used in the same meaning as "a light receiving side of the optical axis direction of the optical systems 200", and the term of "lower side" is used in the same meaning as "an imaging side of the optical axis direction of the optical systems 200".

The two image sensors are mounted on the circuit board on which the camera module 100 should mounted. The two image sensors have a function of respectively photographing the two optical images respectively formed by the two optical systems 200 to obtain the stereo images. Since the stereo images obtained by the two image sensors contain a disparity corresponding to a positional relationship between the two optical systems 200 and a distance to the object, the stereo images can be used for measuring the distance to the object based on the disparity. The two image sensors are provided below the lens driving device 1 so that optical axes of the two optical systems 200 are substantially perpendicular to imaging planes of the two image sensors and the optical axes of the two optical systems 200 substantially coincide with center points of the imaging planes of the two image sensors, respectively. As each of the two image sensors, it is possible to use any image sensor known in the camera field such as a color or monochrome CCD image sensor or CMOS image sensor. The stereo images obtained by the two image sensors are transmitted to an unillustrated control unit (for example, a control unit of an arbitrary device) through wired communication or wireless communication.

When the two optical systems 200 are synchronously driven by the lens driving device 1 in the optical axis direction, separation distances between the optical systems 200 and the corresponding image sensors change, and thus focus adjustment of the camera module 100 is performed. The lens driving device 1 is connected to the control unit and the lens driving device 1 drives the two optical systems 200 in accordance with an electrical current supplied from the control unit to the lens driving device 1. With this configuration, the autofocus function of the camera module 100 is provided.

As shown in FIG. 4, the lens driving device 1 includes a lens holder 2 for holding the two optical systems 200, a housing 3 for containing the lens holder 2 therein, a support mechanism 4 for supporting the lens holder 2 in the housing 3 so that the lens holder 2 can be driven in the optical axis direction of the optical systems 200, and a driving mechanism 5 which is composed of a coil 51 provided on the lens holder 2 and two magnets 52 provided on the housing 3 and configured to provide driving force driving the lens holder 2 in the optical axis direction.

The lens holder 2 is a cylindrical member formed from non-magnetic material such as resin material. The lens holder 2 has a function of holding the two optical systems 200 therein in a state that the two optical systems 200 are spaced apart from each other. As shown in FIGS. 4 and 5, the lens holder 2 includes a rectangular cylindrical body portion 21, two openings 22 formed in the body portion 21 so as to pass through the body portion 21 in the optical direction (the vertical direction) and be spaced apart from each other, and a containing portion 23 formed in the body portion 21 so as to be located between the two openings 22 and pass through the body portion 21 in the optical direction.

Although the body portion 21 has a rectangular cylindrical shape in the illustrated aspect, a shape of the body portion 21 is not necessarily limited thereto as long as the coil 51 can be fixedly provided on an outer peripheral surface of the body portion 21. For example, the body portion 21 may have a circular cylindrical shape or a polygonal cylindrical shape. The two openings 22 have a function of respectively holding the two optical systems 200 therein. The two openings 22 are formed in the body portion 21 so as to have the same configuration as each other and be aligned in the Y direction with being spaced apart from each other. The two openings 22 are formed in the body portion 21 so as to linearly pass through the body portion 21 in the optical direction. Although each of the two openings 22 has a circular cylindrical shape linearly passing the body portion 21 in the optical direction in the illustrated aspect, a shape of each of the two openings 22 is not necessarily limited thereto as long as it can hold the optical system 200 therein. For example, the scope of the present disclosure also involves an aspect in which each of the two openings 22 has a polygonal cylindrical shape and an aspect in which a plurality of grooves for respectively holding elements of the optical system 200 such as a lens and an aperture are formed on an inner peripheral surface of each of the two openings 22. By respectively fixing the two optical system 200 in the two openings 22 by arbitrary fixing means such as an adhesive, an adhesive tape and a retainer, the lens holder 2 can fixedly hold the two optical systems 200.

The containing portion 23 has a function of containing the support mechanism 4 therein. The containing portion 23 is a through hole formed in the body portion 21 so as to be located between the two openings 22 and pass through the body portion 21 in the optical axis direction. The containing portion 23 has a substantially rectangular planar shape in a planar view from the Z direction. The containing portion 23 includes a first surface 231 located on the −Y direction side, a second surface 232 located on the +Y direction side, and two receiving grooves 233 formed on the first surface 231. The first surface 231 and the second surface 232 are flat surfaces perpendicular to the Y direction and extending in the X direction. The first surface 231 and the second surface 232 face each other in parallel with being spaced apart from each other. Further, a pair of surfaces of the containing portion 23 extending in the Y direction are flat surfaces perpendicular to the X direction and perpendicular to the first surface 231 and the second surface 232.

The containing portion 23 includes the two receiving grooves 233 formed on the first surface 231. Each of the two receiving grooves 233 has a function of holding two first guide members 42 (see FIG. 4) of the support mechanism 4, which will be described later. The two receiving grooves 233 are formed on the first surface 231 so as to linearly extend from an upper end to a lower end of the first surface 231 in the optical direction and extend in parallel with each other with being spaced apart from each other. Since the two receiving grooves 233 have the same configuration, one of the two receiving grooves 233 will be described as a representative. The receiving groove 233 has a V-shape whose opening width linearly increases from the −Y direction side toward the +Y direction side. The receiving grooves 233 holds the two first guide members 42 of the support mechanism 4 therein. Further, an upper end and a lower end of the receiving groove 233 are not closed. Thus, the upper end of the receiving groove 233 is opened toward the upper side and the lower end of the receiving groove 233 is opened toward the lower side.

Referring back to FIG. 4, the housing 3 is a box-shaped member formed from non-magnetic material such resin material as is the case with the lens holder 2. The lens holder 2 has a function of containing the components (the lens holder 2, the support mechanism 4, and the driving mechanism 5) of the lens driving device 1 therein. The housing 3 includes a rectangular flat plate-like upper plate 31, four wall portions 32 extending from the upper plate 31 toward the lower side, and a rectangular flat plate-like base 33 facing the upper plate 31. The upper plate 31 is a rectangular flat plate-like portion which covers the components contained in an internal space of the housing 3 from the upper side. The upper plate 31 has two circular openings 311 for respectively exposing the two optical systems 200 held by the lens holder 2 toward the outside. Each of the two openings 311 is formed in the upper plate 31 and at a position for allowing a radius center of each of the openings 311 to coincide with the optical axis of the corresponding optical system 200. Light from the object enters the two optical systems 200 through the two openings 311, and the two optical images of the object are respectively formed by the two optical systems 200.

The four wall portions 32 are flat plate-like portions linearly extending from four edge portions of the upper plate 31 toward the lower side, respectively. Upper ends of the four wall portions 32 are integrally formed with the upper plate 31. The internal space of the housing 3 is defined by a lower surface of the upper plate 31, inner surfaces of the four wall portions 32 and an upper surface of the base 33. The components of the lens driving device 1 are contained in this internal space. The base 33 is a rectangular flat plate-like portion having a shape corresponding to the upper plate 31. Further, lower ends of the four wall portions 32 are fixed on the base 33 by arbitrary fixing means such as an adhesive. The base 33 has two circular openings 331 at positions respectively facing the two openings 311 of the upper plate 31. The light collected by the two optical systems 200 respectively passes through the two openings 331 and then respectively forms the two optical images on the imaging planes of the two image sensors located below the base 33.

The support mechanism 4 provided in the containing portion 23 of the lens holder 2 has a function of supporting the lens holder 2 so that the lens holder 2 can be driven in the optical axis direction of the optical systems 200. As shown in FIGS. 6 and 7, the support mechanism 4 includes a plate-like portion 41 extending in the containing portion 23 in the optical axis direction, four first guide members 42 located on a first surface 412 of the plate-like portion 41 located on the −Y direction side, two second guide members 43 located on a second surface 413 of the plate-like portion 41 located on the +Y direction side, and an elastic member 44 fixed on the second surface 232 of the containing portion 23 of the lens holder 2 for biasing the two second guide members 43 against the second surface 413 of the plate-like portion 41.

Similar to the lens holder 2 and the housing 3, the plate-like portion 41 is a plate-like member formed from non-magnetic material such as resin material. The plate-like portion 41 linearly extends from the base 33 of the housing 3 toward the upper side (toward the light receiving side of the optical axis direction). The plate-like portion 41 includes a plate-like body portion 411, the first surface 412 located on the −Y direction side, the second surface 413 located on the +Y direction side, a first receiving groove 414 formed on the first surface 412, a second receiving groove 415 formed on the first surface 412, and a third receiving groove 416 formed on the second surface 413. The body portion 411 is a plate-like portion extending in the XZ plane. Each of X direction side surfaces of the body portion 411 is a flat surface perpendicular to the X direction. Each of an upper surface and a lower surface of the body portion 411 is a flat surface perpendicular to the Z direction. The lower surface of the body portion 411 may be integrated with the upper surface of the base 33 or may be fixed on the upper surface of the base 33 by arbitrary fixing means such as an adhesive. The upper surface of the body portion 411 faces the upper plate 31 of the housing 3 through a gap therebetween.

The first receiving groove 414 has a function of containing the two of the four first guide members 42 therein. The first receiving groove 414 is a recessed portion linearly extending from an upper end to a lower end of the first surface 412. The first receiving groove 414 has a V-shape whose opening width linearly increases from the +Y direction side toward the −Y direction side. As shown in FIG. 8, the two first guide members 42 are held between one of the receiving grooves 233 of the lens holder 2 and the first receiving groove 414 of the plate-like portion 41.

Referring back to FIG. 6, the second receiving groove 415 has a function of containing remaining two of the four first guide members 42 therein. The second receiving groove 415 is a rectangular recessed portion linearly extending in the optical axis direction. An upper end and a lower end of the second receiving groove 415 are opened toward the outside. Both X direction side surfaces defining the second receiving groove 415 are flat surfaces perpendicular to the X direction. Thus, an opening width of the second receiving groove 415 keeps constant along the Z direction. As shown in FIG. 8, the remaining two of the first guide members 42 are held between the other one of the receiving grooves 233 of the lens holder 2 and the second receiving groove 415 of the plate-like portion 41.

Referring back to FIG. 7, the third receiving groove 416 has a function of containing the two second guide members 43 therein. The third receiving groove 416 is a rectangular recessed portion linearly extending in the optical axis direction. An upper end and a lower end of the third receiving groove 416 are opened toward the outside. Both X direction side surfaces defining the third receiving groove 416 are flat surfaces perpendicular to the X direction. Thus, an opening width of the third receiving groove 416 keeps constant along the Z direction. As shown in FIGS. 8 and 9, the two second guide member 43 are held between the elastic member 44 and the third receiving groove 416 of the plate-like portion 41.

As shown in FIG. 8, the third receiving groove 416 linearly extends in the optical axis direction at a substantially central portion of the second surface 413 in the X direction. On the other hand, in the planar view from the Z direction, the first receiving groove 414 is located on the −X direction side of the third receiving groove 416 and the second receiving groove 415 is located on the +X direction side of the third receiving groove 416. Further, in the planar view from the Z direction, a distance from a center of the third receiving groove 416 (a center point of a bottom surface of the rectangular recessed portion) to a center of the first receiving groove 414 (a top of the V-shape) is preferably substantially equal to a distance from the center of the third receiving groove 416 to a center of the second receiving groove 415 (a center point of a bottom surface of the rectangular recessed portion). Namely, it is preferable that a triangle formed by connecting the center of the first receiving groove 414, the center of the second receiving groove 415 and the center of the third receiving groove 416 by straight lines in the planar view from the Z direction is an isosceles triangle. With this configuration, it is possible to stabilize driving of the lens holder 2 along the plate-like portion 41 in the optical axis direction.

Referring back to FIGS. 6 and 7, the four first guide members 42 and the two second guide members 43 have a function of reducing frictional resistance force caused when the lens holder 2 is driven in the optical axis direction. The four first guide members 42 and the two second guide members 43 are formed from arbitrary hard material such as metal material, ceramic material, and resin material. In this regard, although each of the four first guide members 42 and the two second guide members 43 is a guide ball having a spherical shape in the illustrated aspect, the present disclosure is not limited thereto as long as it can reduce the frictional resistance force caused when the lens holder 2 is driven in the optical axis direction. For example, it is possible to use a columnar member extending in the optical axis direction as the first guide member 42 and the second guide member 43. Further, the numbers of the first guide members 42 and the second guide members 43 to be used are not limited to the illustrated aspect. The numbers of the first guide members 42 and the second guide members 43 to be used may be appropriately changed as necessary.

The two of the four first guide members 42 are held between the first receiving groove 414 of the plate-like portion 41 and the receiving groove 233 of the lens holder 2 in a state that the two first guide members 42 are aligned along the Z direction. The remaining two of the four first guide members 42 are held between the second receiving groove 415 of the plate-like portion 41 and the receiving groove 233 of the lens holder 2 in a state that the remaining two first guide members 42 are aligned along the Z direction. The two second guide members 43 are held between the third receiving groove 416 of the plate-like portion 41 and the clastic member 44 in a state that the two second guide members 42 are aligned along the Z direction. Thus, the lens holder 2 is supported by the plate-like portion 41 through the four first guide members 42, the two second guide members 43, and the elastic member 44 so that the lens holder 2 can be driven in the optical axis direction. The plate-like portion 41 is provided on the base 33 of the housing 3 which is a fixed member, and the elastic member 44 is fixed on the second surface 232 of the containing portion 23 of the lens holder 2 which is a movable member. Thus, by connecting between the fixed member and the movable member by the first guide members 42 and the second guide members 43 as described above, it is possible to reduce the frictional resistance force when the lens holder 2 is driven in the optical axis direction.

The elastic member 44 is fixed on the second surface 232 of the containing portion 23. The elastic member 44 has a function of biasing the two second guide members 43 against the third receiving groove 416 of the plate-like portion 41. Although the elastic member 44 is a leaf spring obtained by performing a bending process on one metal plate in the illustrated aspect, the present disclosure is not limited thereto as long as the elastic member 44 can be fixed on the second surface 232 and bias the two second guide members 43 against the third receiving groove 416 of the plate-like portion 41. For example, the elastic member 44 may be a coil spring fixed on the second surface 232 and biasing the two second guide members 43 against the third receiving groove 416 of the plate-like portion 41. The following description will be given with assuming that the elastic member 44 is typically a leaf spring as shown in the drawings.

The elastic member 44 includes two base portions 441 fixed on the second surface 232 of the containing portion 23, a spring portion 442 protruding from the base portions 441 toward the second surface 413 of the plate-like portion 41, and a receiving groove 443 formed on the spring portion 442 so as to extend in the optical axis direction.

Each of the two base portions 441 is a plate-like portion elongated in the optical axis direction (the vertical direction) and is fixed on the second surface 232 of the containing portion 23 by arbitrary fixing means such as an adhesive. A length of each of the two base portions 441 in the optical axis direction is substantially equal to a length of the second surface 232 of the containing portion 23 in the optical axis direction. The spring portion 442 is a protrusion protruding from the two base portions 441 toward the second surface 413 of the plate-like portion 41. The spring portion 442 provides a spring property of the elastic member 44. The receiving groove 443 is a recessed portion elongated in the optical axis direction. The receiving groove 443 is formed on a top portion (a portion most protruding toward the −Y direction side) of the spring portion 442 so as to be recessed toward the +Y direction side.

The receiving groove 443 has a V-shape whose opening width linearly increases from the +Y direction side toward the −Y direction side. The receiving groove 443 is formed at a position facing the third receiving groove 416 of the plate-like portion 41. The two second guide members 43 are contained in the receiving groove 443 and the spring portion 442 biases the two second guide members 43 contained in the receiving groove 443 against the third receiving groove 416 of the plate-like portion 41 as indicated by a dotted arrow shown in FIGS. 8 and 9. Thus, by biasing the two second guide members 43 against the third receiving groove 416 of the plate-like portion 41 by the elastic member 44, it is possible to improve a degree of adhesion between the lens holder 2 and the support mechanism 4 in the containing portion 23 of the lens holder 2. As a result, it is possible to stabilize the driving of the lens holder 2 in the optical axis direction. Further, as shown in FIG. 8, the clastic member 44 is spaced apart from the second surface 413 of the plate-like portion 41 through a gap therebetween and does not contact with the second surface 413. Thus, when the lens holder 2 is driven in the optical axis direction by the driving force provided by the driving mechanism 5, the clastic member 44 can be also driven in the optical axis direction together with the lens holder 2. Although the receiving groove 443 has the V-shape whose opening width linearly increases from the +Y direction side toward the −Y direction side in the illustrated aspect, a shape of the receiving groove 443 is not limited thereto as long as it can stably contain the two second guide members 43 therein. For example, the receiving groove 443 may have a semi-cylindrical shape corresponding to a shape of the second guide member 43, a rectangular shape similar to the third receiving groove 416 of the plate-like portion 41, or the like.

Referring back to FIG. 4, the driving mechanism 5 has a function of providing the driving force (Lorentz force) for driving the lens holder 2 in the optical direction (the vertical direction). The driving mechanism 5 includes the coil 51 provided on the outer peripheral surface of the body portion 21 of the lens holder 2 and the two magnets 52 respectively provided on inner surfaces of the pair of opposing wall portions 32 of the housing 3. The coil 51 can be obtained by winding an electric wire on the outer peripheral surface of the lens holder 2. The coil 51 is fixed on the outer peripheral surface of the body portion 21 of the lens holder 2, and thus the coil 51 is also driven in the optical direction together with the lens holder 2 when the lens holder 2 is driven in the optical direction. Both end portions of the coil 51 are respectively connected to corresponding terminals of the control unit. Thus, it is possible to generate the driving force for driving the lens holder 2 in accordance with a direction and a magnitude of the electrical current supplied from the control unit to the coil 51.

Each of the two magnets 52 is a plate-like permanent magnet. The two magnets 52 are respectively provided on the inner surfaces of the pair of opposing wall portions 32 of the housing 3 so that the same poles of the two magnets 52 face each other (for example, an N-pole of one of the magnets 52 faces an N-pole of the other one of the magnets 52, or a S-pole of one of the magnets 52 faces a S-pole of the other one of the magnets 52). The two magnets 52 are respectively fixed on the inner surfaces of the pair of opposing wall portions 32 of the housing 3 by arbitrary fixing means such as an adhesive.

Next, detailed description will be given to a layout of an internal structure of the camera module 100 will with reference to FIGS. 8 and 9. FIG. 8 is a horizontal cross-sectional view of the camera module 100 in the XY plane passing through centers of the upper ones of the two first guide members 42 and the two second guide members 43 aligned in the optical direction. FIG. 9 is a longitudinal cross-sectional view of the camera module 100 in the YZ plane passing through centers of the two second guide members 43 aligned in the third receiving groove 416 of the plate-like portion 41 in the optical direction.

As shown in FIG. 8, the two magnets 52 are respectively provided on the inner surfaces of the pair of opposing wall portions 32 (the pair of wall portions 32 extending in the Y direction) of the housing 3. Further, the lens holder 2, the support mechanism 4 (the plate-like portion 41, the four first guide members 42, the two second guide members 43, and the elastic member 44), the coil 51, and the two optical systems 200 are located between the two magnets 52 which face each other. Further, the lens holder 2, the support mechanism 4, and the two optical systems 200 are located on the inner side of the coil 51.

In this regard, the above description explains that the constituent material of the housing 3 is the non-magnetic material. However, the constituent material of the housing 3 is not limited to the non-magnetic material, and the housing 3 may be formed from magnetic material. In particular, by using the magnetic material for forming at least the pair of opposing wall portions 32 (the pair of wall portions 32 extending in the Y direction) of the housing 3 on which the two magnets 52 are respectively provided, it is possible to allow the pair of wall portions 32 to serve as yokes and serve as a part of a magnetic circuit of the driving mechanism 5 together with the magnets 52 and the coil 51.

Regarding the two first guide members 42 located on the upper side (the −X direction side) in FIG. 8, the contact between the first receiving groove 414 of the plate-like portion 41 and the first guide member 42 is a two-point contact. Similarly, the contact between the receiving groove 233 of the lens holder 2 and the first guide member 42 is a two-point contact. Thus, the connection between the lens holder 2 and the plate-like portion 41 through the two first guide members 42 located on the upper side in FIG. 8 becomes strong. As a result, the two first guide members 42 located on the upper side in FIG. 8 serve as a main axis of the driving of the lens holder 2.

On the other hand, the second receiving groove 415 of the plate-like portion 41 has the rectangular shape in order to absorb tolerances of the lens holder 2, the first plate-like portion 41, the first guide members 42, the second guide members 43, and the elastic member 44. With this configuration, each of the two first guide members 42 located on the lower side (the +X direction side) in FIG. 8 is held by a three-point contact between the second receiving groove 415 of the plate-like portion 41 and the receiving groove 233 of the lens holder 2. Thus, the two first guide members 42 located on the lower side in FIG. 8 serve as a sub-axis for the driving of the lens holder 2.

The third receiving groove 416 of the plate-like portion 41 has the rectangular shape. With this configuration, the two second guide members 43 are held between the third receiving groove 416 of the plate-like portion 41 and the receiving groove 443 of the elastic member 44 by a three-point contact. With this configuration, it is possible to absorb the tolerances of the lens holder 2, the plate-like portion 41, the first guide members 42, the second guide members 43, and the elastic member 44, thereby improving the degree of adhesion between the lens holder 2 and the support mechanism 4 in the containing portion 23 of the lens holder 2. In this regard, a steady position of the lens holder 2 in the housing 3 in a steady state in which no electrical current is supplied to the coil 51 is determined by pressing force applied to the two second guide members 43 from the elastic member 44. In one example, the lens holder 2 in the steady state is located on the upper plate 31 or the base 33 of the housing 3 depending on the direction of gravity. In another example, the lens holder 2 in the steady state remains at a predetermined steady position spaced from both of the upper plate 31 and the base 33 of the housing 3.

Further, as is clear from FIGS. 8 and 9, the support mechanism 4 is contained in the containing portion 23 located between the two openings 22 of the lens holder 2 and passing through the body portion 21 of the lens holder 2 in the optical axis direction. In the case of adopting the conventional support mechanism described in the background art section where the pair of leaf springs are used for holding the lens holders 2 so that the lens holders 2 can be vibrated in the optical axis direction, it is necessary to respectively arrange the pair of leaf springs on the upper side and the lower side of the lens holder 2. On the other hand, in the present disclosure, since the support mechanism 4 is contained in the containing portion 23 of the lens holder 2, it is possible to efficiently use spaces in the housing 3, thereby reducing the size of the lens driving device 1.

Further, in the present disclosure, since the lens holder 2 has the two openings 22 for respectively holding the two optical systems 200 therein, it is possible to hold the two optical systems 200 with the one lens holder 2. Thus, as compared with the conventional art described in the background section where the two lens holders are used for holding the two optical systems, it is possible to reduce the number of lens holders to be used.

Further, in the present disclosure, the lens holder 2 is held so that the lens holder 2 can be driven in the optical axis direction by connecting between the plate-like portion 41 and the lens holder 2 through the first guide members 42 and the second guide members 43. Thus, unlike the conventional art described in the background art section, it is not necessary to use the pair of leaf springs. In addition, in the present disclosure, the two magnets 52 are fixed in the housing 3 by the arbitrary fixing means such as an adhesive. Thus, unlike the conventional art described in the background art section, it is not necessary to use the magnet holder. Therefore, according to the present disclosure, it is possible to reduce the number of components of the lens driving device 1 as compared with the conventional art described in the background art section.

Furthermore, in the present disclosure, the two optical systems 200 can be driven in the optical axis direction by the driving mechanism 5 composed of the one coil 51 and the two magnets 52. Namely, in the present disclosure, the one coil 51 and the two magnets 52 are shared for driving the two optical systems 200 in the optical axis direction. On the other hand, in the conventional art described in the background art section, two sets of the one coil and the two magnets are used for driving the two optical systems. Thus, the two coils and the four magnets are used in total. Accordingly, the present disclosure can reduce the number of coils and magnets compared with the conventional art described in the background art section. As described above, according to the present disclosure, it is possible to provide the lens driving device 1 which has the simple configuration constituted of the smaller number of components and whose size can be reduced, and the camera module 100 including the lens driving device 1.

Further, in the present disclosure, since the elastic member 44 biases the two second guide members 43 against the third receiving groove 416 of the plate-like portion 41, it is possible to improve the degree of adhesion between the lens holder 2 and the support mechanism 4 in the containing portion 23 of the lens holder 2. As a result, it is possible to make the connection between the plate-like portion 41 (i.e., the fixed member) and the lens holder 2 (i.e., the movable member) through the first guide members 42 and the second guide members 43 strong and stable, and thereby it is possible to efficiently drive the lens holder 2 in the optical axis direction.

Although the lens driving device and the camera module of the present disclosure have been described based on the illustrated embodiment, the present disclosure is not limited thereto. Each configuration of the embodiment of the present disclosure can be replaced by any configuration capable of performing the same function or any configuration can be added to each configuration of the embodiment of the present disclosure.

A person having ordinary skill in the art and field and art will be able to perform modifications to the described configuration of the lens driving device and the camera module of the embodiment of the present disclosure without significantly departing from the principle, concept and scope of the present disclosure and the lens driving device and the camera module having the modified configuration are also involved within the scope of the present disclosure.

In addition, the number and the types of the components of the lens driving device and the camera module shown in FIGS. 3 to 9 are merely illustrative examples and the present disclosure is not necessarily limited thereto. An aspect in which any component is added or combined or any component is deleted without departing from the principle and the intent of the present disclosure is also involved within the scope of the present disclosure.

The invention claimed is:

1. A lens driving device, comprising:

a lens holder for holding two optical systems;

a housing for containing the lens holder therein;

a support mechanism for supporting the lens holder in the housing so that the lens holder can be driven in an optical axis direction of the two optical systems; and a driving mechanism including a coil provided on the lens holder and a magnet provided on the housing for providing driving force driving the lens holder in the optical axis direction, wherein the lens holder includes:

a body portion, two openings formed in the body portion so as to pass through the body portion in the optical axis direction and be spaced apart from each other for respectively containing the two optical systems therein, and a containing portion formed in the body portion for containing the support mechanism therein, and wherein the containing portion is located between the two openings and passes through the body portion in the optical axis direction, wherein the support mechanism includes:

a plate-like portion extending in the containing portion in the optical axis direction, and a first guide member located between a first surface of the plate-like portion and a first surface of the containing portion, a second guide member located on a second surface of the plate-like portion, and an elastic member provided between a second surface of the containing portion and the second surface of the plate-like portion for biasing the second guide member against the second surface of the plate-like portion, wherein the first guide member holds the lens holder so that the lens holder can be driven in the optical axis direction, wherein the plate-like portion includes a receiving groove formed on the second surface of the plate-like portion so as to extend in the optical axis direction, wherein the second guide member is held in the receiving groove formed on the second surface of the plate-like portion by the elastic member, and wherein the elastic member includes:

a plate-like base portion fixed on the second surface of the containing portion, a spring portion protruding from the base portion toward the second surface of the plate-like portion, and a receiving groove formed on the spring portion so as to extend in the optical axis direction, and wherein the second guide member is held between the receiving groove formed on the second surface of the plate-like portion and the receiving groove of the elastic member.

2. The lens driving device as claimed in claim 1, wherein the housing includes:

an upper plate having a rectangular flat plate-like shape, four wall portions linearly extending from edge portions of the upper plate toward an imaging side of the optical axis direction, and a base facing the upper plate, and wherein the plate-like portion of the support mechanism linearly extends from the base of the housing toward a light receiving side of the optical axis direction.

3. The lens driving device as claimed in claim 1, wherein the containing portion includes a receiving groove formed on the first surface of the containing portion so as to extend in the optical axis direction, wherein the plate-like portion includes a receiving groove formed on the first surface of the plate-like portion so as to extend in the optical axis direction, and wherein the first guide member is sandwiched between the receiving groove of the containing portion and the receiving groove of the plate-like portion.

4. A camera module comprising:

a lens driving device defined by claim 1; and the two optical systems held by the lens holder of the lens driving device.

* * * * *